United States Patent [19]

Bürgin et al.

[11] Patent Number: 5,086,715
[45] Date of Patent: Feb. 11, 1992

[54] PROCESS FOR INCINERATING HETEROGENEOUS COMBUSTIBLE MATERIAL

[75] Inventors: Markus E. Bürgin, Berikon; Martin R. Zweifel, Wettingen, both of Switzerland

[73] Assignee: W&E Umwelttechnik AG, Zurich, Switzerland

[21] Appl. No.: 545,237

[22] Filed: Jun. 27, 1990

[30] Foreign Application Priority Data

Jun. 29, 1989 [CH] Switzerland .................. 2427/89

[51] Int. Cl.$^5$ .................................................. F23B 7/00
[52] U.S. Cl. .................................. 110/342; 110/215; 110/216
[58] Field of Search ................ 110/342, 344, 215, 216

[56] References Cited

U.S. PATENT DOCUMENTS

| | | | |
|---|---|---|---|
| 3,831,535 | 8/1974 | Baardson | 110/216 |
| 4,651,655 | 3/1987 | Kunzel | 110/215 |
| 4,726,302 | 2/1988 | Hein et al. | 110/215 |
| 4,762,074 | 8/1988 | Sorensen | 110/215 |
| 4,788,918 | 12/1988 | Keller | 110/216 |
| 4,860,671 | 8/1989 | Glorioso | 110/215 |
| 4,909,161 | 3/1990 | Germain | 110/216 |
| 4,932,334 | 6/1990 | Patte et al. | 110/216 |
| 4,958,578 | 9/1990 | Houser | 110/216 |

Primary Examiner—Henry C. Yuen
Attorney, Agent, or Firm—Egli International

[57] ABSTRACT

The flue gases formed in the combustion chamber of the incinerator furnace, after they have reached a temperature of about 450° C., are brought to a temperature of 200°-250° C. by shock-type cooling. Before this shock-cooling (quenching), heat recovery from the flue gases is carried out in a high-temperature stage from 1000°-1200° C. to about 450° C. and, after the shock-cooling, in a low-temperature stage from 200°-250° C. to about 150° C. As a result, a de novo synthesis is avoided in which dioxins and furans are formed from the components of the flue gases and the fly ash.

10 Claims, 1 Drawing Sheet

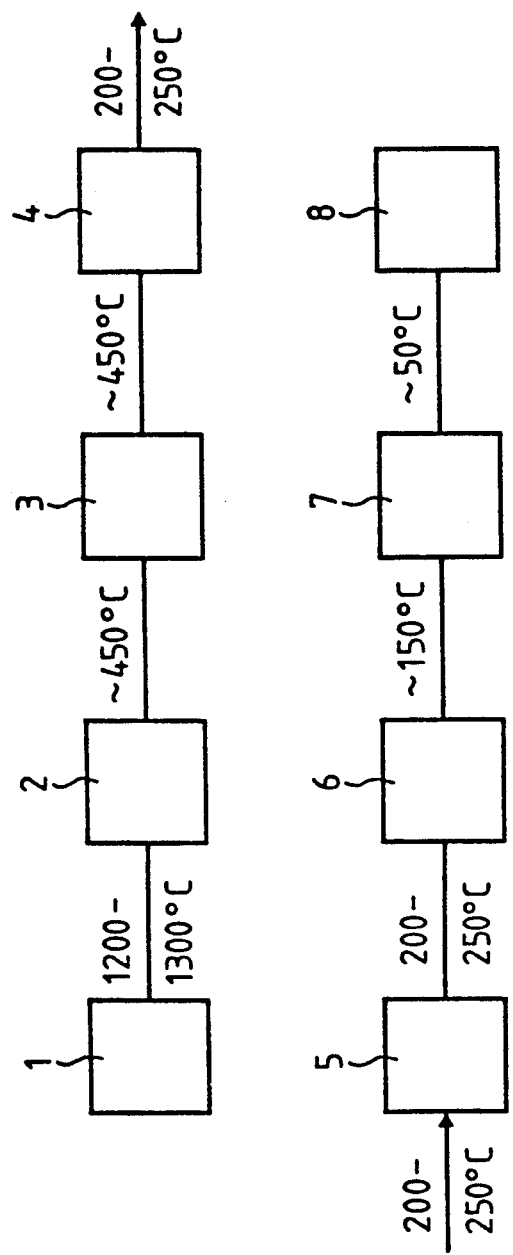

PROCESS FOR INCINERATING HETEROGENEOUS COMBUSTIBLE MATERIAL

The invention relates to a process for incinerating heterogeneous combustible material, especially refuse, in an incinerator furnace, the flue gases formed in the incineration being discharged from the combustion chamber of the furnace, and being cooled and dedusted.

In contrast to a constant fuel such as oil, coal and the like, heterogeneous combustible material is to be understood as meaning materials of varying origin, for example industrial and domestic wastes. The latter arises nowadays in large quantities and must therefore be burned in refuse incinerator plants to reduce them. A refuse incinerator plant comprises essentially an incinerator furnace which is designed with grate firing in most embodiments. The flue gases formed in the incineration collect in the combustion chamber located above the grate, but they also contain mixed-in particles of fly ash. The heat energy of the flue gases, whose temperature in the combustion chamber is about 1200°-1300° C., is in most cases converted in a steam generator unit. The widest possible temperature span is utilized here in the various plant sections of the steam generator unit, such as steam boiler, superheater and preheater, so that the flue gases still have a temperature of about 250° C. or slightly less downstream of the steam generator unit. This is then followed by purification of the flue gases, for example by means of fabric filters or electrostatic precipitators and then by means of wet scrubbers.

In view of the increasingly stringent requirements for reducing the pollution of the environment by such refuse incineration plants, increasingly more stringent demands must be met by the purity of the flue gases issuing from the refuse incineration plants. It is known here, in particular for the incineration of industrial refuse or special refuse, to use a plant containing a rotary kiln. Although the major part of the refuse introduced is burnt in the latter, still unburnt constituents remain, and these are burned up in an aftercombustion chamber adjoining the rotary kiln. This is achieved, on the one hand, by injecting oxygen into the aftercombustion chamber and, on the other hand, by installing an additional burner for reliably maintaining the required temperature.

In refuse incinerator plants, whose combustion furnace is fitted with grate firing, measures for reducing pollution of the environment are also necessary. A known solution of this problem envisages the provision of an aftercombustion chamber downstream of the refuse incinerator furnace, the aftercombustion chamber being connected to the combustion chamber of the incinerator furnace by a passage.

Although the pollution of the environment by such plants is substantially reduced by considerably diminishing by complete burn-up those constituents of the flue gases which are responsible for the formation of the highly toxic dioxins and furans, this requires additional expense on construction.

This is the starting point of the invention which is based on the object of further developing a process of the type described at the outset in such a way that the additional installation of an aftercombustion chamber is avoided and nevertheless the same reduction of pollution of the environment is achieved as in the two above-mentioned plants with aftercombustion chambers.

According to the invention, this object is achieved by cooling the flue gases in a first cooling stage, in particular with energy recovery from the flue gases, from their exit temperature from the combustion chamber of 1000°-1200° C. to a temperature of about 450° C., whereupon the flue gases are subjected to rapid cooling to 200°-250° C., before the flue gases are cooled further, in particular by further heat recovery from the flue gases, dedusted and purified.

The invention is illustrated in the drawing in an embodiment example and described below.

The FIGURE shows a block diagram of a plant in which the process according to the invention is applied.

The invention starts from the consideration that the pollution of the environment by a refuse incineration plant can also be greatly reduced by avoiding a de novo synthesis in which the harmful dioxins and furans are formed from the flue gases.

In the figure, such a plant is shown as a block diagram, the temperatures reached in each case being entered between the individual blocks. In the combustion chamber 1 of the incinerator furnace, flue gases are formed which have a temperature of 1000°-1200° C. These are passed to a steam generator unit 2. This essentially comprises the plant sections of the high-temperature stage with the steam boiler, the superheater and the reheater. After leaving this high-temperature stage, the flue gases have a temperature of about 450° C. At this temperature, the nitrogen oxide treatment, for example with ammonia, is carried out in a chamber 3. If appropriate, this treatment can be omitted.

The flue gases then pass at a temperature of about 450° C. into a chamber 4, where they are shock-cooled by jetting-in of water. In this treatment, which is also called quenching, the temperature of the flue gases is very rapidly reduced to 250° C. This rapid temperature change has the consequence that the formation of dioxins and furans is virtually avoided, even if the preconditions are given in the flue gases, that is to say the presence of oxygen and steam in the gas phase and active, organic carbon particles in the fly ash particles, which can react with inorganic chlorides of alkali/alkaline earth metals with the participation of metal salts, for example copper(II) chloride. Because of the rapid cooling of the flue gases, there is insufficient reaction time for the formation of dioxins and furans according to the de novo synthesis.

When leaving the chamber 4 after quenching, the flue gases still have a temperature of about 250° C. and are passed to a dedusting unit 5. This unit essentially consists of fabric filters or electrostatic precipitators. After the precipitation of dust, further heat energy is recovered in a low-temperature stage 6, for example by a preheating device for boiler feed water. The flue gases leave the low-temperature stage 6 at about 150° C. This is then followed by a wet flue gas purification 7, by means of which hydrogen chloride, sulfur dioxide and hydrogen fluoride are separated out. As a result of the wet flue gas purification, the flue gases are cooled to about 50° C., whereupon they pass through the stack 8 into the open.

The treatment stages after quenching can also be varied. Thus, the flue gas purification 7 after quenching can also be carried out, for example, by a quasi-dry flue gas purification, for instance by injection of lime, whereby the flue gas temperature falls to about 140° C. The heat recovery then takes place in the low-temperature stage 6, the temperature being reduced in two phases down to 50° C.

It is, however, essential that the rapid cooling of the flue gases is carried out between the high-temperature stage 2 and the low-temperature stage 6, by means of which the renewed formation of dioxins and furans is reliably avoided.

We claim:

1. A process for incinerating heterogeneous combustible material in an incinerator furnace comprising the steps of:
    (a) burning heterogenous combustible material in a combustion chamber (1) of an incinerator furnace, producing flue gases having a flue gas combustion temperature of 1000° C.-1200° C., which are then passed to a steam generator (2), after which the flue gases are discharged at a temperature of about 450° C.;
    (b) rapidly cooling the flue gases by a shock-cooling means to a temperature of about 250° C. to eliminate substantially the formation of toxic dioxins and furans;
    (c) dedusting the flue gases with dedusting means (5);
    (d) cooling further the flue gases by further heat recovery means (6) a temperature of about 150° C.;
    (e) purifying the flue gases by wet flue gas purification means (7) to remove substantially hydrogen chloride, sulfur dioxide and hydrogen fluoride, which further cools the temperature of the flue gases to about 50° C.; and
    (f) passing the flue gases which are environmentally safe through a stack (8) into open air.

2. A process for incinerating heterogeneous combustible material, especially refuse, in an incinerator furnace, the flue gases formed in the incineration of the refuse being discharged from the combustion chamber of the furnace and being cooled, dedusted and purified, which comprises at least the steps of:
    cooling the flue gases in a first cooling stage, in particular with heat recovery from the flue gases, from their exit temperature from the combustion chamber of 1000°-1200° C. to a temperature of about 450° C.,
    rapidly cooling the flue gases by shock-cooling means to a temperature of 200°-250° C. to avoid substantially the formation of toxic dioxins and furans in the flue gases.

3. The process as claimed in claim 2, wherein the step of rapidly cooling of the flue gases is effected by jetting water into the flue gases, also known as quenching.

4. The process as claimed in claim 3, wherein the step of rapidly cooling is carried out between the steps of recoveries of heat from the flue gases.

5. The process as claimed in claim 4, wherein the shock-type cooling of the flue gases is carried out between heat recovery in a high-temperature stage from 1000°-1200° C. to about 450° C. and heat recovery in a low-temperature stage from 200°-250° C. to about 150° C.

6. The process as claimed in claim 2, wherein the heat recovery in a low temperature stage is carried out from about 140° C. to 50° C., the lowering of the temperature of the flue gases from 200°-250° C. to about 140° C. being utilized for flue gas purification, for example by injection of lime.

7. A process for incinerating heterogenous combustible material such as refuse in an incinerator furnace, in which the flue gases formed in the incineration of the refuse are discharged from the combustion chamber of the furnace, that eliminates the need for an aftercombustion chamber and nevertheless substantially avoid the emission of toxic dioxins and furans into the atmosphere comprising the steps of:
    cooling the flue gases in a first cooling stage with heat recovery from the flue gases from a temperature of 1000°-1200° C. when passing from the combustion chamber to a temperature of about 450° C.;
    shock cooling the flue gases to a temperature of 200°-250° C. with a shock-cooling means that jets water into the flue gases to avoid substantially the formation of toxic dioxins and furans;
    dedusting the flue gases with dedusting means;
    cooling further the flue gases by further heat recovery means a temperature of about 150° C.;
    purifying the flue gases by wet flue gas purification means; and
    passing the flue gases which are environmentally safe through a stack into the atmosphere.

8. The process as claimed in claim 7, wherein the step of rapidly cooling is carried out between the steps of recoveries of heat from the flue gases.

9. The process as claimed in claim 8, wherein the step of rapidly cooling of the flue gases is carried out between heat recovery in a high-temperature stage from 1000°-1200° C. to about 450° C. and heat recovery in a low-temperature stage from 200°-250° C. to about 150° C.

10. The process as claimed in claim 9, wherein the heat recovery in a low temperature stage is carried out from about 140° C. to 50° C., the lowering of the temperature of the flue gases from 200°-250° C. to about 140° C. being utilized for flue gas purification, for example by injection of lime.

* * * * *